US009544027B2

(12) United States Patent
Cornell et al.

(10) Patent No.: US 9,544,027 B2
(45) Date of Patent: Jan. 10, 2017

(54) LOOP POWERED TRANSMITTER WITH A SINGLE TAP DATA ISOLATION TRANSFORMER AND UNIPOLAR VOLTAGE CONVERTERS

(71) Applicant: TEXAS INSTRUMENTS INCORPORATED, Dallas, TX (US)

(72) Inventors: Evan David Cornell, Rowlett, TX (US); Christopher Sean Tracy, Frisco, TX (US); Ajinder Pal Singh, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 14 days.

(21) Appl. No.: 14/625,932

(22) Filed: Feb. 19, 2015

(65) Prior Publication Data
US 2015/0236759 A1 Aug. 20, 2015

Related U.S. Application Data

(60) Provisional application No. 61/941,861, filed on Feb. 19, 2014.

(51) Int. Cl.
*H04B 5/00* (2006.01)
(52) U.S. Cl.
CPC ............ *H04B 5/0093* (2013.01); *H04B 5/005* (2013.01); *H04B 5/0031* (2013.01)
(58) Field of Classification Search
CPC ...... H04B 5/0093; H04B 5/0031; H04B 5/005
(Continued)

(56) References Cited

U.S. PATENT DOCUMENTS 4,541,112 A * 9/1985 Kern ........................ H04R 3/00
330/127
5,467,012 A * 11/1995 Nystrom ................ G01R 21/08
324/107

(Continued)

FOREIGN PATENT DOCUMENTS

EP 0518916 B1 * 7/1997 ............. G08C 19/02
WO WO 9113417 A1 * 9/1991 ............. G08C 19/02

OTHER PUBLICATIONS

Guochen et al;, "Design of Intelligent Transmitter Based on HART Protocol," in Intelligent Computation Technology and Automation (ICICTA), 2010 International Conference on , vol. 2, No., pp. 40-43, May 11-12, 2010.*

(Continued)

*Primary Examiner* — Daniel Washburn
*Assistant Examiner* — Berhanu Tadese
(74) *Attorney, Agent, or Firm* — Lawrence J. Bassuk; Charles A. Brill; Frank D. Cimino

(57) ABSTRACT

A loop-powered transmitter includes a data isolation transformer including primary and secondary windings and an analog-to-digital converter (ADC) to convert a sensor signal to a digital value. The transmitter also includes a first microcontroller coupled between a multi-signal interface of the ADC and only one tap of the primary winding of the data isolation transformer, and a second microcontroller coupled to the secondary winding of the data isolation transformer. The first microcontroller is configured to receive the digital value from the ADC over the multi-signal interface and to provide data indicative of the digital value via a single output data line through the tap of the primary winding of the data isolation transformer to the second microcontroller. Unipolar voltage converters may also be included in the transmitter along with a current limiting resistor for the data (Continued)

isolation transformer to reduce the risk of saturating the data isolation transformer.

22 Claims, 2 Drawing Sheets

(58) Field of Classification Search
USPC ........................................................ 375/256
See application file for complete search history.

(56) References Cited

U.S. PATENT DOCUMENTS

| | | | | |
|---|---|---|---|---|
| 5,596,466 | A * | 1/1997 | Ochi | H02M 7/5387 361/103 |
| 6,640,308 | B1 * | 10/2003 | Keyghobad | G05B 19/042 370/254 |
| 7,545,131 | B1 * | 6/2009 | Alexander | H02M 3/156 323/275 |
| 7,729,135 | B1 * | 6/2010 | Schimel | H02M 3/33569 363/21.01 |
| 9,054,725 | B1 * | 6/2015 | Fest, Sr. | H04L 12/10 |
| 2004/0184517 | A1 * | 9/2004 | Westfield | G01D 3/08 375/219 |
| 2005/0080493 | A1 * | 4/2005 | Arntson | G01D 21/00 700/39 |
| 2007/0069716 | A1 * | 3/2007 | Sleeman | G01R 15/125 324/99 D |
| 2008/0151973 | A1 * | 6/2008 | Calvin | G01D 21/00 375/216 |
| 2008/0231211 | A1 * | 9/2008 | Baarman | H02M 3/33523 315/294 |
| 2008/0267301 | A1 * | 10/2008 | Alfano | H01L 23/48 375/258 |
| 2008/0317106 | A1 * | 12/2008 | Leung | G06F 13/4072 375/220 |
| 2009/0027243 | A1 * | 1/2009 | Leung | H01L 23/48 341/100 |
| 2009/0072994 | A1 | 3/2009 | Kleven et al. | |
| 2009/0253388 | A1 * | 10/2009 | Kielb | G01D 21/00 455/117 |
| 2009/0295367 | A1 | 12/2009 | Fauveau | |
| 2009/0303090 | A1 * | 12/2009 | Korn | G08C 19/02 341/110 |
| 2011/0136451 | A1 | 6/2011 | Schrag et al. | |
| 2012/0020430 | A1 * | 1/2012 | Haase | H03M 3/438 375/295 |
| 2014/0036544 | A1 * | 2/2014 | Bavel | H02M 3/3372 363/16 |
| 2014/0107856 | A1 | 4/2014 | Haynes | |
| 2014/0210276 | A1 * | 7/2014 | Shinoda | H04B 5/0012 307/104 |

OTHER PUBLICATIONS

Franco Contadini, MAXQ Microcontroller Drives a Smart and Intelligent 4-20mA Transmitter, Dec. 2005—Internet Citation—http://pdfserv.maximintegrated.com/en/an/AN3653.pdf.*

Application Note 722, 3V-5V DACs Support Intelligent Current Loop, by Maxim Integrated Products, Dec. 29, 2000—internet citation—http://www.maxim-ic.com/an722.*

* cited by examiner

LOOP POWERED TRANSMITTER WITH A SINGLE TAP DATA ISOLATION TRANSFORMER AND UNIPOLAR VOLTAGE CONVERTERS

CROSS-REFERENCE TO RELATED APPLICATIONS

The present application claims priority to U.S. Provisional Patent Application No. 61/941,861, filed Feb. 19, 2014, titled "A NOVEL, LOW-POWER, SINGLE-WIRE DATA INTERFACE THAT COMPLIES WITH ISOLATION AND POWER REQUIREMENTS FOR AN INDUSTRIAL LOOP-POWERED TRANSMITTER," which is hereby incorporated herein by reference in its entirety.

BACKGROUND

Factory automation and Industrial Process Control require monitoring and maintaining process variables at the appropriate levels in order to make decisions and drive actions. A sensor may be used to measure a process parameter such as temperature, pressure, etc. A transmitter receives a signal from the sensor and transmits a value indicative of the sensor's reading to a programmable logic controller (PLC).

The PLC may be a substantial distance from the sensor and its transmitter. Many installations use a "current loop" to communicate a value from sensor to PLC. In a current loop-based system, the current loop is a two-wire interface which is powered by a voltage source at or near the PLC but whose current is controlled by the transmitter in relation to the sensor value to be transmitted. The PLC determines the magnitude of the current on the loop to recover the transmitted sensor value.

SUMMARY

In one example, a loop-powered transmitter includes a data isolation transformer including primary and secondary windings and an analog-to-digital converter (ADC) to convert a sensor signal to a digital value. The transmitter also includes a first microcontroller coupled between a multi-signal interface of the ADC and only one tap of the primary winding of the data isolation transformer, and a second microcontroller coupled to the secondary winding of the data isolation transformer. The first microcontroller is configured to receive the digital value from the ADC over the multi-signal interface and to provide data indicative of the digital value via a single output data line through the tap of the primary winding of the data isolation transformer to the second microcontroller. Unipolar voltage converters may also be included in the transmitter along with a current limiting resistor for the data isolation transformer to reduce the risk of saturating the data isolation transformer.

In another example, a loop-powered transmitter includes a power isolation transformer, a data isolation transformer including a primary winding, and an analog-to-digital converter (ADC) configured to convert a sensor signal to a digital value and to provide the digital value through the data isolation transformer. The transmitter in this example also includes a first unipolar voltage converter to receive power through the power isolation transformer and to generate a unipolar operating power to operate the ADC. A current limiting resistor also is provided and connects the primary winding of the data isolation transformer to ground to thereby prevent the primary winding of the data isolation transformer from saturating.

In yet another example, a loop-powered transmitter system includes a first unipolar voltage converter, a second unipolar voltage converter, and a power isolation transformer including a primary winding and a secondary winding. The primary winding of the power isolation transformer couples to the second unipolar voltage converter and the secondary winding of the power transformer couples to the first unipolar voltage converter. The transmitter further includes a data isolation transformer including a primary winding and a secondary winding. An analog-to-digital converter (ADC) also is included and provides a multi-signal interface. A first microcontroller couples between the multi-signal output interface of the ADC and only a single tap of the primary winding of the data isolation transformer. The transmitter further includes a second microcontroller coupled to only a single tap of the secondary winding of the data isolation transformer. The first microcontroller is configured to receive a digital value from the ADC over the multi-signal interface and to provide data indicative of the digital value via a single output data line through the tap of the primary winding of the data isolation transformer to the second microcontroller. The ADC and the first microcontroller are configured to receive unipolar operating power from the first unipolar voltage converter. The second microcontroller is configured to receive unipolar operating power from the second unipolar voltage converter. The transmitter in this example also includes a current limiting resistor connecting the primary winding of the data isolation transformer to ground to thereby prevent the primary winding of the data isolation transformer from saturating

BRIEF DESCRIPTION OF THE DRAWINGS

For a detailed description of exemplary embodiments of the invention, reference will now be made to the accompanying drawings in which.

DETAILED DESCRIPTION

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct. Thus, if a first device couples to a second device, that connection may be through a direct connection or through an indirect connection via other devices and connections.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
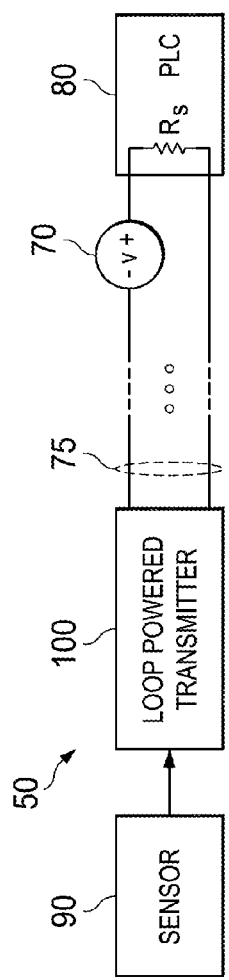
FIG. 1 shows a current loop system in accordance with an embodiment.

FIG. 1 illustrates a current loop-based system 50 including a sensor 90, a loop powered transmitter, a voltage source 70 and a programmable logic controller (PLC) 80. The sensor 90 may be implemented as any desired type of sensor including, for example, a temperature sensor, pressure sensor, humidity sensor, etc. The voltage source 70 powers a two-wire current loop 75. The loop-powered transmitter 100 causes the magnitude of current on the current loop 75 to be a particular level based on the sensor's output value. In some implementations, the current loop 75 is a 4-20 mA current loop which means that 4 mA encodes a 0% sensor value and 20 mA encodes a 100% sensor value. For example, if the sensor 90 is a temperature sensor configured to measure temperatures between 0 degrees Celsius and 100 degrees Celsius, 0 degrees will be transmitted with a current of 4 mA on the loop and 100 degrees will be transmitted with a current of 20 mA. Temperature values in between 0 and 100 degrees may be encoded according to a linear scale between 4 and 20 mA.

The PLC 80 may include a sense resistor Rs, whose voltage is proportional to the current on the current loop 75. The voltage across the sense resistor is determined by the PLC and converted into a sensor value. The PLC then may take appropriate action as is deemed warranted based on the sensor value.

The transmitter 100 contains electronics whose operational power is derived from the current loop 75. That is, the transmitter 100 does not have an independent power source to power its electronics. With a minimum current according to the encoding scheme of 4 mA, the loop powered transmitter 100 should consume power below a threshold such that it does draws less than 4 ma of current from the loop, and preferably less than 3.5 mA. If the loop powered transmitter 100 draws too much current, the transmitter will not be able to transmit a 0% sensor value of 4 mA.

Figure 2:
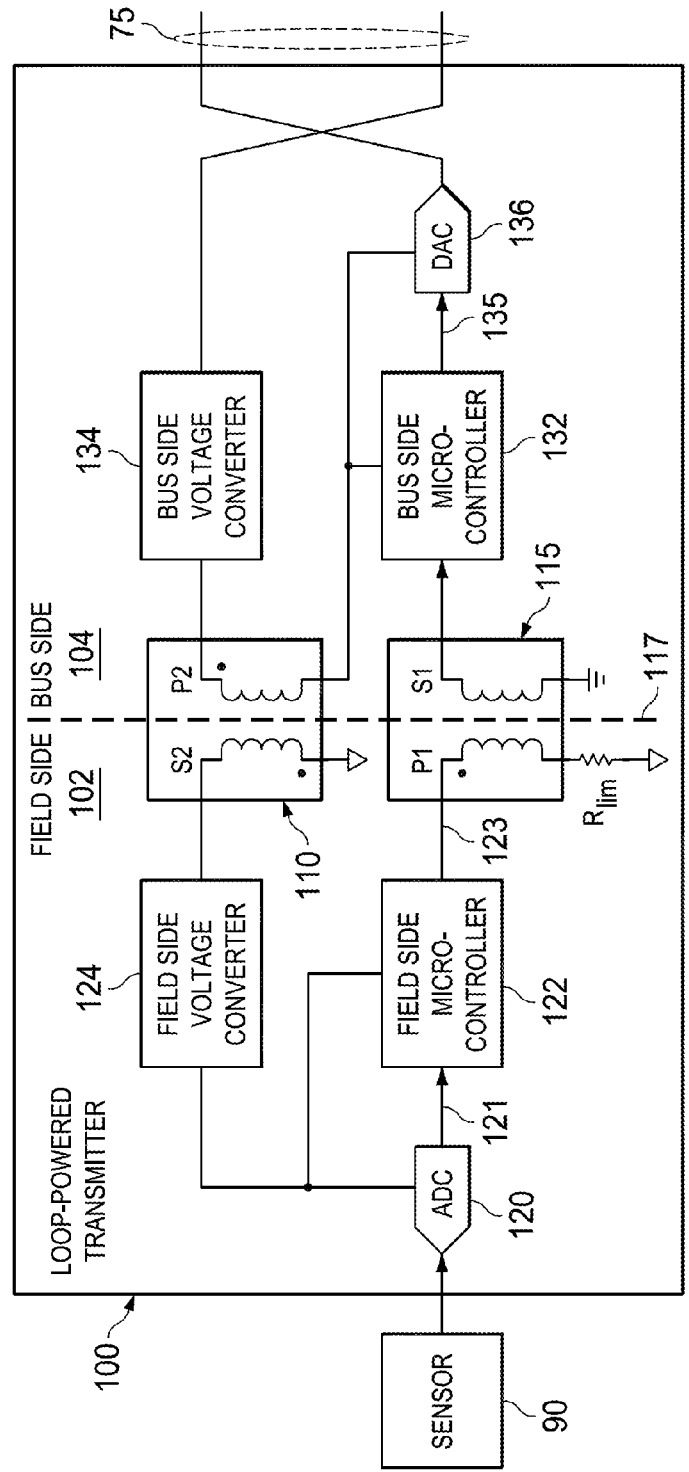
FIG. 2 shows a block diagram of a transmitter in accordance with an embodiment.

FIG. 2 shows an illustrative block diagram of the loop powered transmitter 100. The transmitter 100 in the example of FIG. 2 includes a power isolation transformer 110 and a data isolation transformer 115. The transformers 110 and 115 define a field side 102 and a bus side 104 as shown. The field and bus sides 102, 104 are on opposite sides of the power and data isolation barrier 117 created by the transformers. The field side 102 includes an analog-to-digital converter (ADC) 120, a field side microcontroller 122, and a field side voltage converter 124. The bus side 104 includes a bus side microcontroller 132, a bus side voltage converter 134, and a digital-to-analog converter (DAC) 136. The field side microcontroller 122 couples to the primary winding (P1) of the data isolation transformer 115 and the bus side microcontroller 132 couples to the secondary winding (S1) of the data isolation transformer. The bus side voltage converter 134 couples to the primary winding P2 of the power isolation transformer 110, and the field side voltage converter 134 couples to the secondary winding S2 of the power isolation transformer.

The sensor 90 generates a sensor signal that is provided to an analog-to-digital converter (ADC). The ADC 120 converts the sensor signal to a digital value and provides the digital value to the field side microcontroller 122 via a multi-signal interface 121. The ADC 120 may also provide additional signal conditioning functions such as amplification, filtering, etc. In some implementations, the multi-signal interface 121 is a Serial Peripheral Interface (SPI) which includes a data output signal, a data input signal, a clock signal, and slave select signal. In other implementations, the multi-signal interface 121 may be other than SPI. The input interface 135 to the DAC 136 also may be a multi-signal interface such as SPI.

The digital value from the ADC 120 is provided through the data isolation transformer 115 to the DAC 136 whose analog output is used to drive the current loop 75 at a level so as to specify the sensor value. If the ADC 120 and DAC 136 were connected to the data isolation transformer 115, the transformer would have to provide multiple taps to accommodate the multi-signal interface 121. For the SPI protocol, for example, a separate transformer tap would be needed for each of the data output, data input, clock, and slave select signals thereby greatly complicating the design of the data isolation transformer. Instead, field and bus side microcontrollers 122, 132 are used to communicate data across the data isolation transformer. The field side microcontroller 122 couples to the multi-signal interface 121 of the ADC 120 to receive the digital value from the ADC and provides data indicative of the digital value via a single output line 123 through a single tap of the primary winding P1 of the data isolation transformer 115, which couple to the secondary winding S1 of the data isolation transformer through a single tap as well. As such, only a single tap is needed for data communications between the ADC 120 and the DAC 136. The output line from the field side microcontroller 122 preferably is a serial data interface. The serial data is transmitted through the data isolation transformer 115 and to the bus side microcontroller 132. Thus bus side microcontroller 132 provides the data received from the field side microcontroller through the data isolation transformer to the multi-signal interface 135 of the DAC 136.

Power is supplied to the various components shown in the example of FIG. 2 from the bus side voltage converter 134 and the field side voltage converter 124. Both voltage converters are unipolar converters. Unipolar voltage converters generate positive voltage, but not negative voltages. For example, either or both of the voltage converters may generate 3.3V output voltages to power the various components depicted in FIG. 2.

The bus side voltage converter 134 receives its input voltage from the current loop 75 and generates an output voltage which is supplied to the primary winding P2 of the power isolation transformer 110, and through the primary winding to the bus side microcontroller 132 and to the DAC 136. The bus side microcontroller 132 and the DAC 136 thus receive their operating power from the bus side voltage converter 134.

On the field side 102, the field side voltage converter 124 is driven from the secondary winding S2 of the power isolation transformer 110 and generates unipolar operating power to operate the ADC 120 and the field side microcontroller 122.

The use of unipolar voltage converters simplifies power management for the transmitter 102, but increases the risk that the primary winding P1 of the data isolation transformer 115 will become saturated due to excessive current through the primary winding. With unipolar voltages, the average voltage applied to the primary winding P1 will be at a level between 0 and the positive voltage level (e.g., 3.3V) with the specific average voltage level depending on the ratio of 1's to 0's on the interface between the microcontrollers 122 and 132 (e.g., on the output line 123 of the field side microcontroller 122). The use of a bipolar power scheme would include positive and negative voltages and thus reduce the average voltage applied to the primary winding P1 of the data isolation transformer thereby reducing the risk of saturating the transformer. However, the use of bipolar voltage converters complicates the power management of the transmitter.

To address the increased risk problem for saturating the data isolation transformer 115, a current limiting resistor $R_{lim}$ is included which is connected between the primary winding P1 of the data isolation transformer and ground as shown in FIG. 2. The current limiting resistor $R_{lim}$ limits the amount of current through the transformer and thus helps to prevent the primary winding P1 from saturating. In some examples, the resistance of current limiting resistor $R_{lim}$ is 5 Kohms, although the resistor can be other than 5 Kohms in other implementations.

Figure 3:
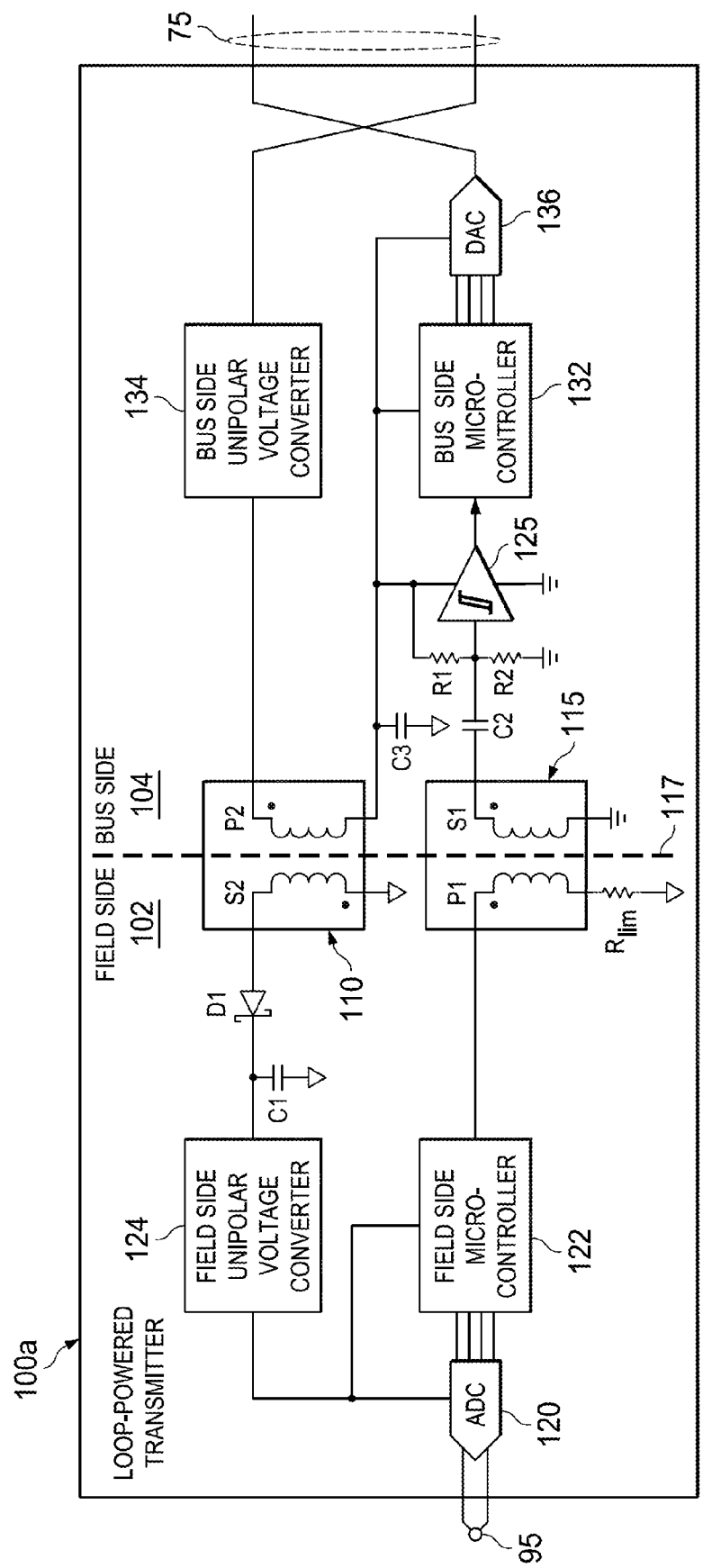
FIG. 3 shows a block diagram of a transmitter in accordance with another embodiment.

FIG. 3 provides a further example of a loop powered transmitter 100a. Some of the components in FIG. 3 are the same as for the loop powered transmitter 100 in FIG. 2 and thus their description may not be repeated herein. The sensor 90 mentioned above is a thermistor, resistance temperature detector (RTD), or thermocouple 95 (i.e., a temperature sensor). The field side unipolar voltage converter 124 is connected to the secondary winding S2 of the power isolation transformer 110 through a Schottky diode D1 as shown. The Schottky diode provides a low forward voltage drop and acts as a rectifier for the input voltage to the field side voltage converter. A capacitor C1 also is proved to connect the output of the Shottky trigger to ground for filtering purposes.

On the bus side 104, a capacitor C2 couples the secondary winding S1 of the data isolation transformer 115 to an input of a Schmitt trigger 125. A Schmitt trigger is a comparator with hysteresis to recover each digital bit transmitted by the field side microcontroller 122 through the data isolation transformer 125. Resistors R1 and R2 are also provided as shown to fully implement a Schmitt trigger and provide to bias the input of the Schmitt trigger to a mid-voltage range. Capacitor C3 is also included on the bus side 104 to AC-couple the signal from the transformer into the Schmitt trigger. The combination of resistors R1 and R2 and capacitor C3 also provide a low-pass filtering effect which causes the serial data stream between the microcontrollers to appear as positive and negative spikes at the input of the Schmitt trigger 125, which are then recovered into full 1's and 0's on the bus side microcontroller 132.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A loop-powered transmitter, comprising:
a data isolation transformer including a primary winding and a secondary winding;
an analog-to-digital converter (ADC) to convert a sensor signal to a digital value, the ADC including a multi-signal interface; and
a first microcontroller coupled between the multi-signal interface of the ADC and only one tap of the primary winding of the data isolation transformer;
a second microcontroller coupled to a tap of the secondary winding of the data isolation transformer, the second microcontroller having a multi-signal interface output;
a digital-to-analog converter (DAC) having a digital input and a power input, the digital input connecting to the digital multi-signal interface output of the second microcontroller;
a second unipolar voltage converter coupled to a primary winding of a power isolation transformer and to the power input of the DAC.

2. The loop-powered transmitter of claim 1 further comprising:
a first unipolar voltage converter coupled to the secondary winding of the power isolation transformer to thereby receive power through the power isolation transformer and to generate a unipolar operating power to operate the ADC and the first microcontroller; and
a current limiting resistor connecting the primary winding of the data isolation transformer to ground.

3. The loop-powered transmitter of claim 2, in which the second microcontroller is configured to receive the digital value from the first microcontroller through the data isolation transformer.

4. The loop-powered transmitter of claim 3, in which the second unipolar voltage converter coupled to the primary winding of the power isolation transformer and, from a voltage on a current loop, to generate a unipolar operating power to operate the second microcontroller and the DAC.

5. The loop-powered transmitter of claim 1, wherein the second microcontroller couples to the DAC via the multi-signal interface.

6. The loop-powered transmitter of claim 1, in which the second unipolar voltage converter is coupled to the primary winding of the power isolation transformer to generate a unipolar operating power from a current loop, the generated unipolar operating power to operate the second microcontroller.

7. The loop-powered transmitter of claim 6 further comprising: a current limiting resistor connecting the primary winding of the data isolation transformer to ground.

8. The loop-powered transmitter of claim 1 further including a current limiting resistor connecting the primary winding of the data isolation transformer to ground.

9. A loop-powered transmitter, comprising:
a power isolation transformer;
a data isolation transformer including a primary winding and a secondary winding;
an analog-to-digital converter (ADC) configured to convert an analog signal to a digital value and to provide the digital value through the data isolation transformer;
a first unipolar voltage converter to receive power through the power isolation transformer and to generate a unipolar operating power to operate the ADC;
a current limiting resistor connecting the primary winding of the data isolation transformer to ground
a first microcontroller coupled between the multi-signal interface of the ADC and only one tap of the primary winding of the data isolation transformer;
a second microcontroller coupled to the tap of the secondary winding of the data isolation transformer, the second microcontroller having a multi-signal interface output;
a digital-to-analog converter (DAC) having a digital input and a power input, the digital input connecting to the digital multi-signal interface output of the second microcontroller; and
a second unipolar voltage converter coupled to a primary winding of the power isolation transformer and to the power input of the DAC.

10. The loop-powered transmitter of claim 9, wherein the ADC is configured to provide the digital value through the first and second microcontrollers and the data isolation transformer to the DAC.

11. The loop-powered transmitter of claim 10 wherein the first microcontroller is coupled between the multi-signal output interface of the ADC and only one tap of a primary winding of the data isolation transformer, and the second microcontroller is coupled between the secondary winding of the data isolation transformer and the DAC.

12. The loop-powered transmitter of claim 10, wherein the second unipolar voltage converter is configured to generate, from a voltage on a current loop, a unipolar operating power to operate the second microcontroller and the DAC and to provide power to the first unipolar voltage converter through the power isolation transformer.

13. The loop-powered transmitter of claim 12 wherein the DAC is configured to modulate a current on the current loop based on the digital value received by the second microcontroller through the data isolation transformer from the first microcontroller.

14. The loop-powered transmitter of claim 9 wherein the analog signal includes a sensor signal.

15. The loop-powered transmitter of claim 9 wherein the analog signal includes a temperature sensor signal.

16. A loop-powered transmitter, comprising:
a data isolation transformer having a primary winding and a secondary winding, the primary winding having a tap;
an analog-to-digital converter (ADC) having, an analog input lead and a digital multi-signal interface output and a power input;
a first microcontroller connected to the digital output of the ADC and the tap of the primary winding;
a power isolation transformer having a primary winding and a secondary winding;
a first unipolar voltage converter coupled to the secondary winding of the power isolation transformer and the power input of the ADC;
a second microcontroller coupled to the tap of the secondary winding of the data isolation transformer, the second microcontroller having a multi-signal interface output; and
a digital-to-analog converter (DAC) having a digital input and a power input, the digital multi-signal interface output of the second microcontroller.

17. The loop-powered transmitter of claim 16 including a current limiting resistor connecting the primary winding of the data isolation transformer to a ground terminal.

18. The loop-powered transmitter of claim 16, in which the second microcontroller receives a digital value from the first microcontroller through the data isolation transformer.

19. The loop-powered transmitter of claim 18 including:
a second unipolar voltage converter coupled to the primary winding of the power isolation transformer.

20. The loop-powered transmitter of claim 18, in which:
the first microcontroller is connected to only a single tap of the primary winding of the data isolation transformer; and
the second microcontroller is connected to only a single tap of the secondary winding of the data isolation transformer.

21. A loop-powered transmitter, comprising:
a power isolation transformer having a primary winding and a secondary winding;
a data isolation transformer having a primary winding and a secondary winding, the primary winding and the secondary winding of the data isolation transformer each having a tap;
an analog-to-digital converter (ADC) having, an analog input lead and a digital multi-signal interface output and a power input;
a first microcontroller connected to the digital output of the ADC and the tap of the primary winding of the data isolation transformer;
a first unipolar voltage converter coupled to the secondary winding of the power isolation transformer and the power input of the ADC;
a second microcontroller coupled to the tap of the secondary winding of the data isolation transformer, the second microcontroller having a multi-signal interface output;
a digital-to-analog converter (DAC) having a digital input and a power input, the digital input connecting to the digital multi-signal interface output of the second microcontroller; and
a second unipolar voltage converter coupled to the primary winding of the power isolation transformer and to the power input of the DAC.

22. The loop-powered transmitter of claim 21, in which:
the first microcontroller is connected to the data isolation transformer only through the tap of the primary winding; and
the second microcontroller is connected to the data isolation transformer only through tap of the secondary winding.

* * * * *